(12) United States Patent  
Cremeens et al.

(10) Patent No.: US 8,091,354 B2
(45) Date of Patent: Jan. 10, 2012

(54) EXHAUST ASSEMBLY WITH UNIVERSAL MULTI-POSITION WATER TRAP

(75) Inventors: Chris M. Cremeens, Madison, WI (US); David M. Grimm, Verona, WI (US); Ashish S. Waknis, Maharashtra (IN); Michael J. Lamps, Madison, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 937 days.

(21) Appl. No.: 12/104,520

(22) Filed: Apr. 17, 2008

(65) Prior Publication Data

US 2009/0260351 A1 Oct. 22, 2009

(51) Int. Cl.
*F01N 3/02* (2006.01)

(52) U.S. Cl. ........... 60/309; 60/272; 60/298; 60/310; 60/320; 60/324; 440/89 R; 440/89 B; 440/89 E; 440/89 F

(58) Field of Classification Search .......... 60/272, 60/279, 298, 299, 309, 310, 320, 324; 440/89 R, 440/89 B, 89 E, 89 F See application file for complete search history.

(56) References Cited

U.S. PATENT DOCUMENTS

| 3,417,549 | A | | 12/1968 | Leosis | |
|---|---|---|---|---|---|
| 4,019,456 | A | * | 4/1977 | Harbert | 440/88 R |
| 5,121,602 | A | * | 6/1992 | McCorvey | 60/310 |
| 5,259,797 | A | * | 11/1993 | Miles et al. | 440/89 R |
| 5,321,215 | A | | 6/1994 | Kicinski | |
| 5,324,217 | A | | 6/1994 | Mineo | |
| 5,366,401 | A | * | 11/1994 | Nanami et al. | 440/89 R |
| 5,857,324 | A | * | 1/1999 | Scappatura et al. | 60/274 |
| 6,152,258 | A | | 11/2000 | Powers et al. | |
| 6,802,387 | B1 | | 10/2004 | Kreger et al. | |
| 6,868,670 | B1 | | 3/2005 | Schellin | |
| 7,114,330 | B1 | * | 10/2006 | Schellin | 60/309 |
| 7,340,889 | B2 | * | 3/2008 | Riquelme | 60/310 |
| 7,587,894 | B2 | * | 9/2009 | Kang et al. | 60/309 |
| 7,713,493 | B2 | * | 5/2010 | Bosanec et al. | 422/180 |
| 2007/0113547 | A1 | | 5/2007 | Thaler | |

FOREIGN PATENT DOCUMENTS

GB 2433308 6/2007

* cited by examiner

*Primary Examiner* — Binh Q Tran

(74) *Attorney, Agent, or Firm* — Andrus, Sceales, Starke & Sawall, LLP

(57) ABSTRACT

An exhaust assembly includes a water trap blocking upstream water flow at a plurality of angular positions enabling universal application and flexibility of orientation.

15 Claims, 8 Drawing Sheets

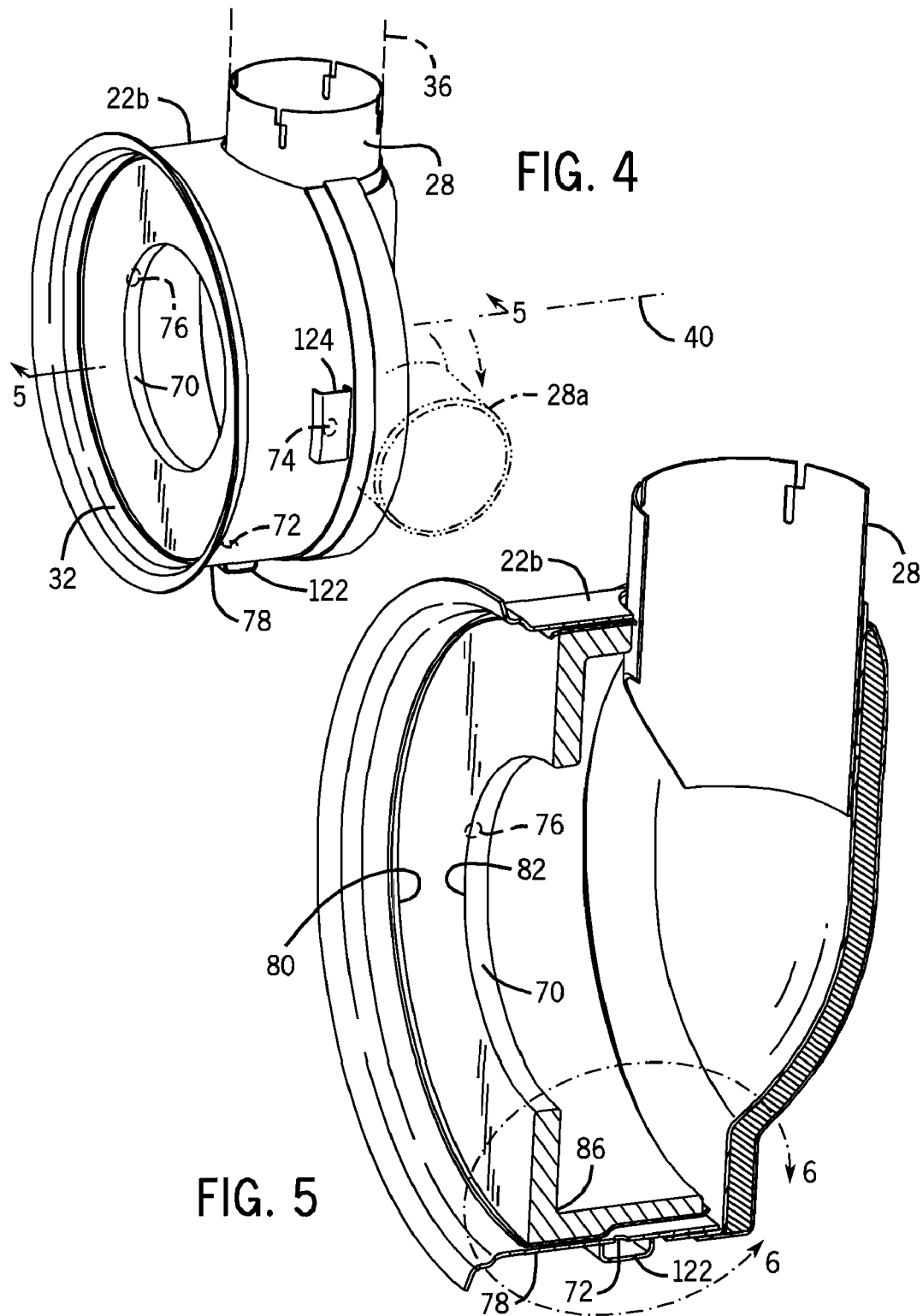

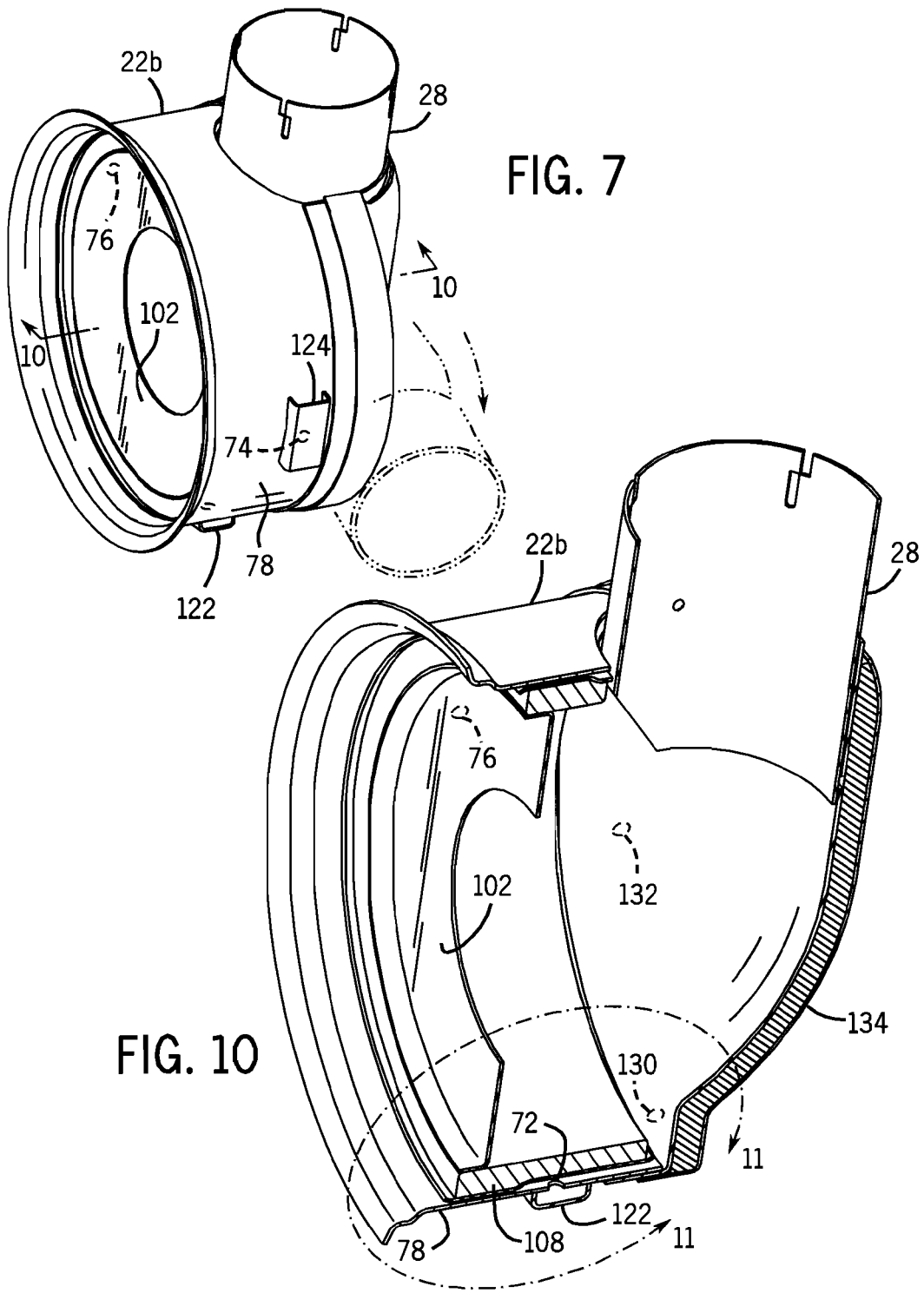

EXHAUST ASSEMBLY WITH UNIVERSAL MULTI-POSITION WATER TRAP

BACKGROUND AND SUMMARY

The invention relates to exhaust assemblies having a water trap.

Exhaust assemblies typically include a housing having an inlet receiving exhaust, an outlet discharging the exhaust, an interior chamber through which the exhaust flows from upstream to downstream from the inlet along a downstream direction to the outlet, and an exhaust pipe extending from the outlet and directing the exhaust to atmosphere. A water trap may be provided in the housing downstream of the interior chamber and upstream of the outlet and blocking water which may enter the exhaust pipe from flowing along an upstream direction into the interior chamber. This is desirable where the interior chamber has one or more components which may be damaged by water intrusion, for example exhaust aftertreatment elements such as catalysts, filters, etc.

The present invention arose during continuing development efforts directed toward the above noted exhaust assemblies.

BRIEF DESCRIPTION OF THE DRAWINGS

FIG. 4 is a perspective view of a portion of an exhaust assembly in accordance with the present invention.

FIG. 5 is an enlarged sectional view taken along line 5-5 of FIG. 4.

FIG. 7 is like FIG. 4 and shows another embodiment.

FIG. 10 is an enlarged sectional view taken along line 10-10 of FIG. 7.

DETAILED DESCRIPTION

Prior Art

Figure 1:
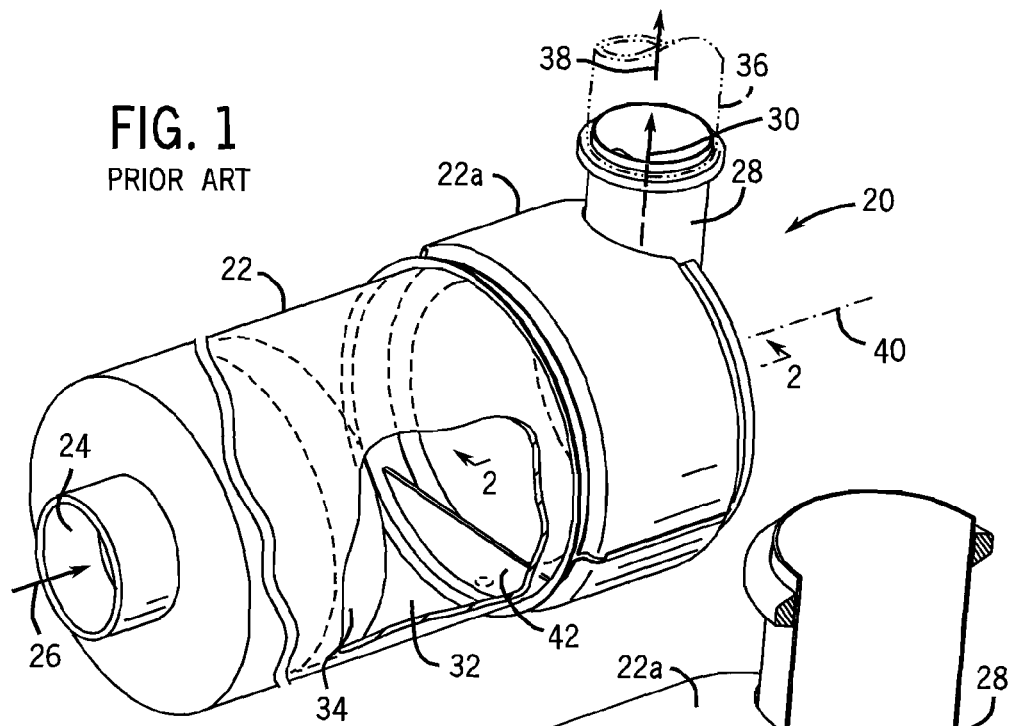
FIG. 1 is a perspective view, partially cut away, of a portion of an exhaust assembly known in the prior art.

FIG. 1 shows an exhaust assembly 20 including a housing 22 having an inlet 24 receiving exhaust as shown at arrow 26, an outlet 28 discharging the exhaust as shown at arrow 30, an interior chamber 32 through which the exhaust flows from upstream to downstream (left to right in FIG. 1) from inlet 24 along a downstream direction (rightwardly in FIG. 1) to outlet 28. Interior chamber 32 may include an exhaust aftertreatment element, for example as shown in dashed line at 34, such as a catalytic element, filter, etc. An exhaust pipe 36 extends from outlet 28 and directs the exhaust to atmosphere as shown at arrow 38. Housing 22 extends axially along an axis 40 having at least a partial vector component extending horizontally. A water trap dam 42 is provided in the housing downstream of interior chamber 32 and upstream of outlet 28 and blocking water which may enter exhaust pipe 36 from flowing along an upstream direction (leftwardly in FIG. 1) into interior chamber 32. This protects aftertreatment element 34 from water intrusion damage.

Figure 2:
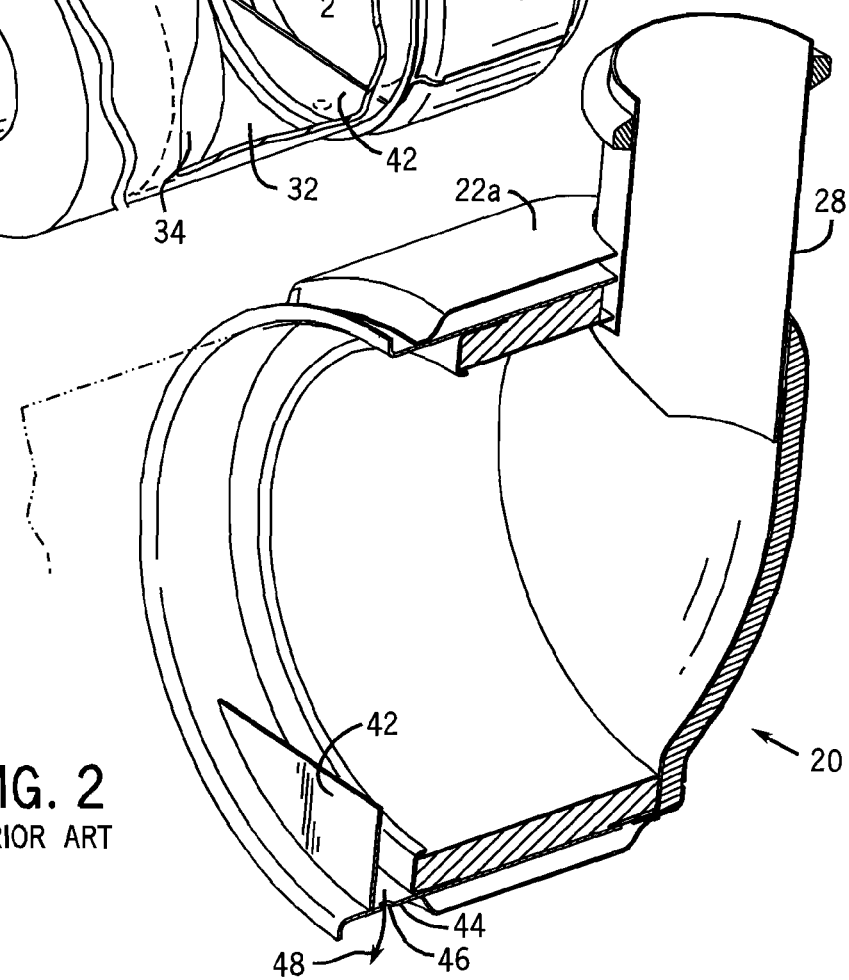
FIG. 2 is an enlarged sectional view taken along line 2-2 of FIG. 1.

In one embodiment known in the prior art, FIG. 2, housing sidewall 44 has a water drain hole 46 draining water therethrough as shown at arrow 48.

Figure 3:
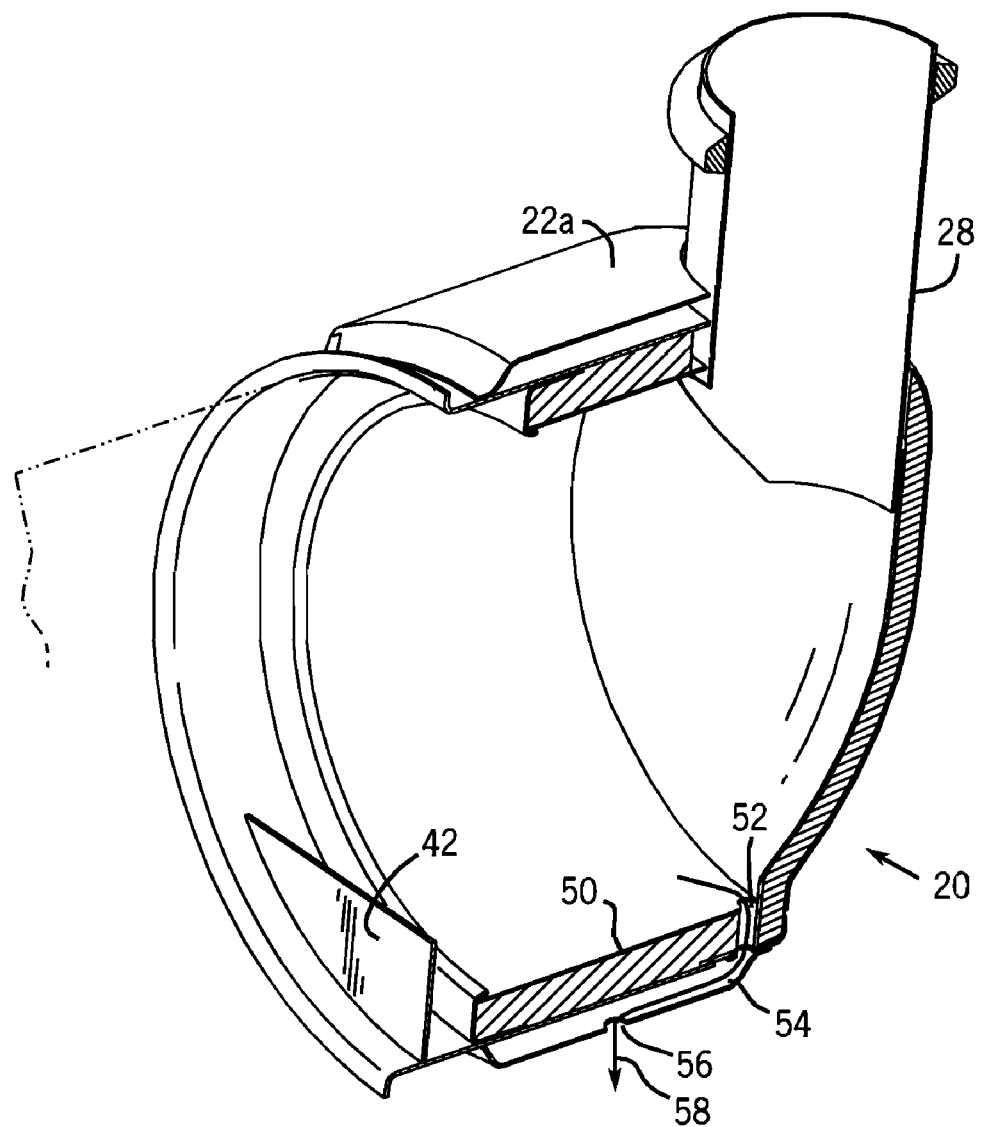
FIG. 3 is like FIG. 2 and shows another embodiment known in the prior art.

In another embodiment known in the prior art, FIG. 3, the layer of thermal insulation 50 along the housing sidewall is spaced from the axial end of the housing by a gap 52 providing a water drain passage therethrough into collection chamber 54 for drainage at hole 56 as shown at water drain arrow 58.

In FIGS. 1-3, outlet 28 is a side outlet which extends non-parallel to axis 40. In the depicted embodiments, side outlet 28 extends upwardly. In other applications, it may be desired that the side outlet 28 extend rightwardly horizontally, or leftwardly horizontally, etc. For these different implementations, a different housing end portion at 22a must be selected from inventory, to accommodate the desired orientation, for example a rightwardly extending side outlet 28 (rather than the upwardly extending outlet as shown in FIGS. 1-3) would require selection of a housing end portion 22a having its outlet 28 extending to the right, and water trap dam 42 re-orientated to be at the bottom of such housing end portion, and water drain hole 46 or 56 to be at the bottom of such housing end portion. This in turn requires that multiple parts and components be stocked in inventory, which is deemed not cost effective.

Present Application

FIGS. 4-11 illustrate the present invention and use like reference numerals from above where appropriate to facilitate understanding.

In FIGS. 4, 5, a water trap 70 is provided in housing end portion 22b downstream of interior chamber 32 and upstream of outlet 28 and blocking water which may enter exhaust pipe 36 from flowing along an upstream direction (leftwardly in FIGS. 4, 5) into interior chamber 32. Water trap 70 blocks upstream water flow at a plurality of angular positions about axis 40, whereby outlet 28 may extend upwardly as shown in solid line in FIG. 4, or may extend horizontally rightwardly as shown in dashed line at 28a, or other orientations, all with the same housing end portion 22b and water trap 70, without having to change parts, nor the consequent requirement of stocking multiple alternate orientation parts in inventory.

Figure 6:
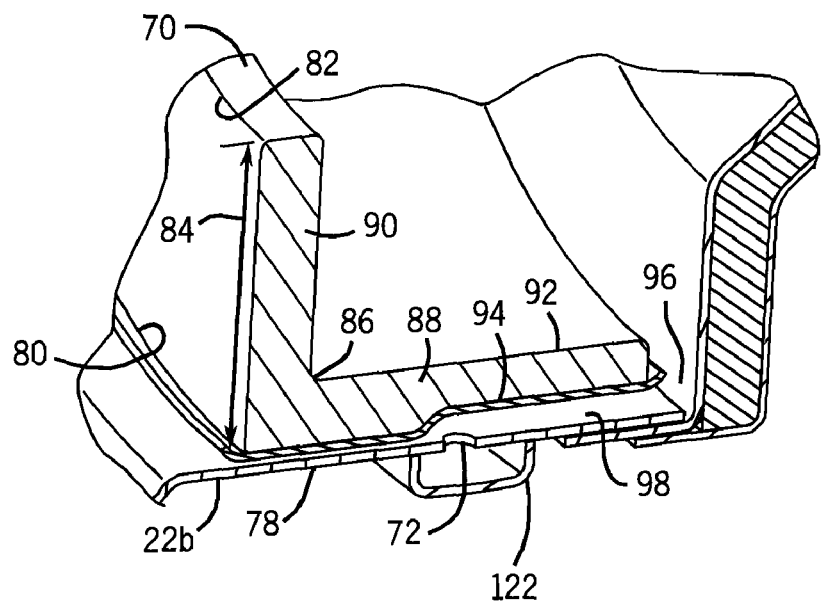
FIG. 6 is an enlarged view of a portion of FIG. 5 taken along line 6-6.
Figure 11:
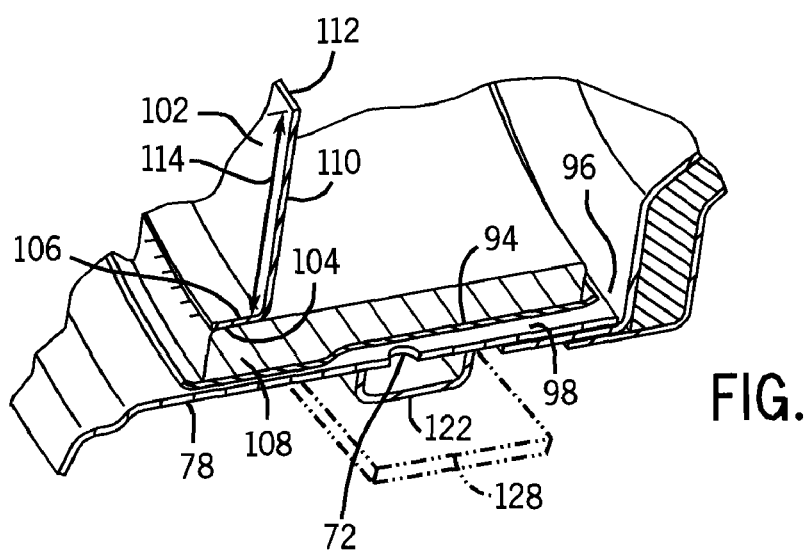
FIG. 11 is an enlarged view of a portion of FIG. 10 taken along line 11-11.

Housing portion 22b, FIGS. 4-6, has a plurality of water drains, such as 72, 74, 76 at a respective plurality of angular positions about axis 40. The water drains are arcuately spaced from each other about axis 40, and provide water drainage for the respective orientation of housing end portion 22b and outlet 28. For example, when outlet 28 is orientated to point upwardly, water drain 72 is at the bottom of the housing, and provides water drainage. When the housing outlet is orientated to point rightwardly, e.g. as shown in dashed line at 28a in FIG. 4, water drain 74 is at the bottom of the housing and provides water drainage. When the outlet is orientated to point leftwardly, i.e. oppositely to 28a, then water drain 76 is at the bottom of the housing and provides water drainage. Water trap 70 blocks upstream water flow at a plurality of angular positions about axis 40, not just a singular position as in FIGS. 1-3. The noted plurality of angular positions preferably include at least two angular positions spaced by at least 180°, for flexibility in orientation of outlet 28, and further preferably when exhaust pipe 36 is a side outlet exhaust pipe extending non-parallel to axis 40, such side outlet exhaust pipe is rotatable 360° about axis 40, and the noted plurality of angular positions lie along a 360° arc about axis 40.

Water trap 70 is preferably provided by a dam extending non-parallel to axis 40, and preferably having a constant vertical height which is the same in each of the noted angular positions. Housing 22 at end portion 22b includes a cylindrical sidewall 78. Dam 70 is preferably an annulus having an outer circumference 80 at sidewall 78 and extending radially inwardly to an inner circumference 82. The vertical span, as shown at 84, FIG. 6, between inner and outer circumferences 82 and 80 at the bottom of the annulus provides the noted constant vertical height which is the same at each of the noted angular positions.

In one embodiment, FIGS. 4-6, water trap dam 70 is provided by an L-shaped member 86 in cross-section, FIGS. 5, 6, having a first leg 88 extending along sidewall 78, and a second leg 90 extending non-parallel to axis 40. In one form of this embodiment, dam 70 is an L-shaped thermal insulation member, including each of the first and second legs 88 and 90 being thermally insulating, to both: a) block upstream water flow, particularly by second leg 90; and b) reduce outer skin temperature of sidewall 78, particularly by first leg 88. If the insulation is susceptible to water damage, then it is preferred that the insulation be wrapped by a waterproof coating, e.g. a metallic foil 92. In addition, a liner or cradle 94 may be provided between the insulation and sidewall 78 to further support the insulation and to provide a gap 96 between the end of the insulation and the axial end of the housing and to provide a flow channel or passage 98 to water drain 72, such that water drains through gap 96 and channel 98 to water drain hole 72.

FIGS. 7-11 show a further embodiment and use like reference numerals from above where appropriate to facilitate understanding. The noted water trap dam 70 of FIGS. 4-6 is provided in FIGS. 7-11 as an L-shaped flange 102, FIG. 10, having an outer surface 104, FIG. 11, at first leg 106, secured to the housing at sidewall 78. In one form of such embodiment, sidewall 78 has an inner surface with thermal insulation 108 extending therealong, which may include liner or cradle 94, and the outer surface 104 of L-shaped flange 102 at first leg 106 is welded to the thermal insulation at the sidewall. The second leg 110 of L-shaped member 102 extends non-parallel to axis 40. Water trap dam 102 is an annulus having an outer circumference at 104 at sidewall 78 and extending radially inwardly to an inner circumference at 112. The vertical span 114 between inner and outer circumferences 112 and 104 at the bottom of the annulus provides the noted constant vertical height which is the same for each of the noted angular positions, in turn providing the noted flexibility of orientation of outlet 28 and exhaust pipe 36, and universal application and implementation of the present system without stocking multiple alternate orientation parts in inventory.

Figure 8:
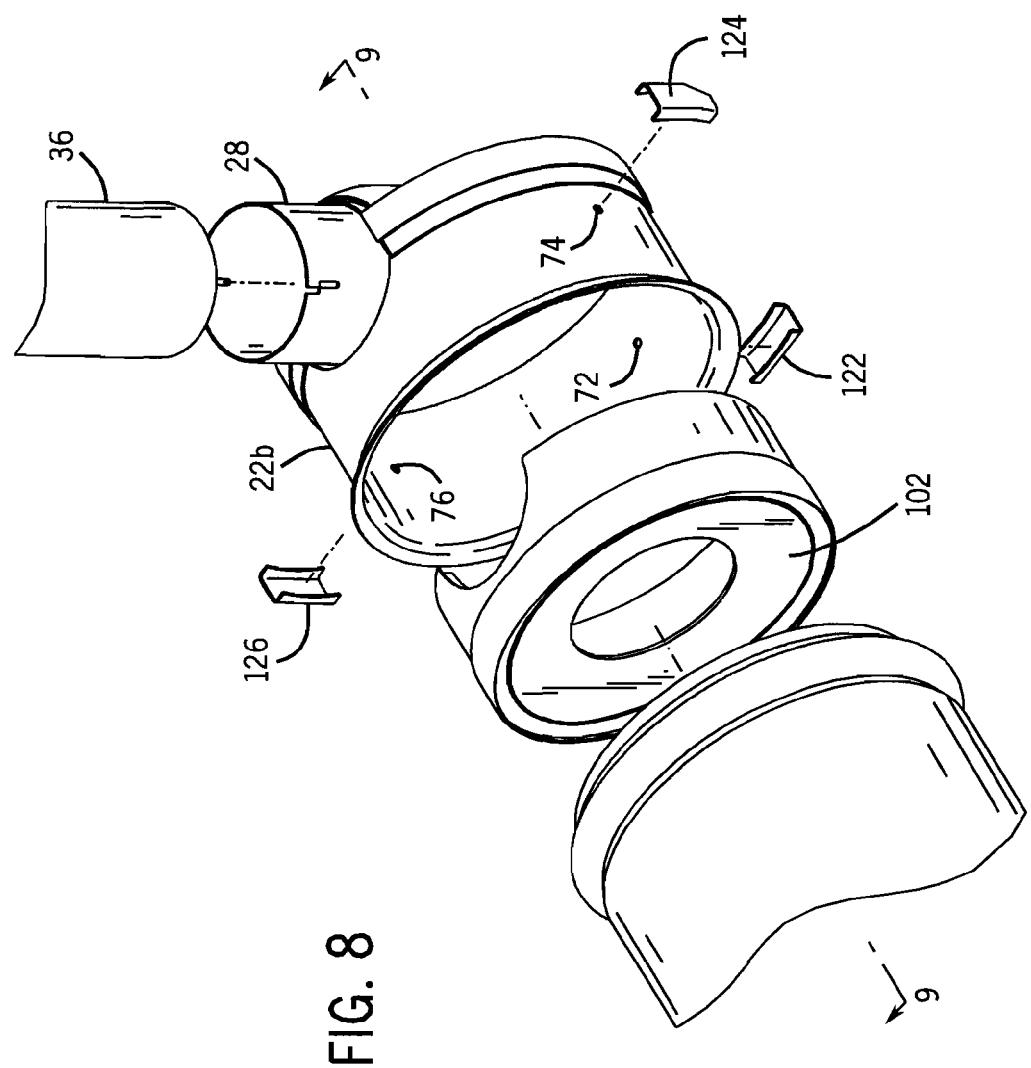
FIG. 8 is an exploded perspective view of an exhaust assembly in accordance with the invention.
Figure 9:
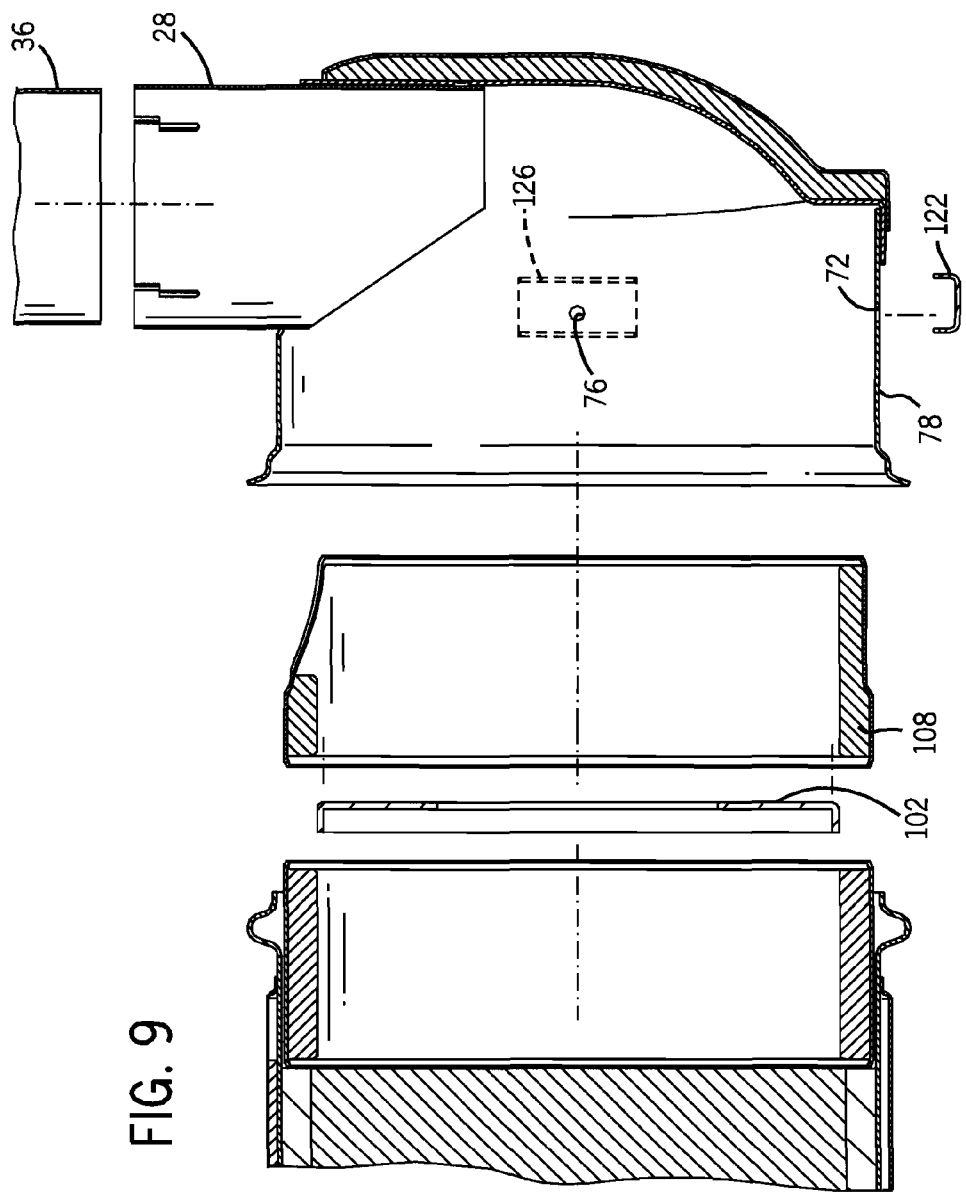
FIG. 9 is a sectional view taken along line 9-9 of FIG. 8.

A plurality of diffusers, e.g. 122, 124, 126, FIG. 8, are each spaced radially outwardly of a respective water drain 72, 74, 76, relative to axis 40. The diffusers disperse exhaust from the respective water drain hole when the latter is not draining water, whereby to aid in cooling of the exhaust. The housing sidewall 78 has an outer surface subject to engagement by one or more mounting clamps, e.g. as schematically shown in dashed line at 128 in FIG. 11. Installation or repair personnel may use mounting clamps to assemble, install, replace, etc. the exhaust assembly in various implementations, including in various engine compartments, and so on. The use and placement of such clamps may be unpredictable and/or not in compliance with recommended manufacturer specifications. Accordingly, improper placement of a mounting clamp in FIGS. 1-3 may cover and block a water drain hole such as 46 or 56. Diffusers 122, 124, 126 provide shrouds spaced radially outwardly of respective water drain holes 72, 74, 76 and ensure that the holes are not blocked by one or more mounting clamps. The housing includes the noted sidewall 78 which is preferably arcuate, and further preferably cylindrical. The water drains are provided by the noted holes 72, 74, 76, etc., through the sidewall. The diffusers 122, 124, 126 provided by the noted shrouds deflect the exhaust to flow tangentially relative to the arcuate sidewall.

Figure 12:
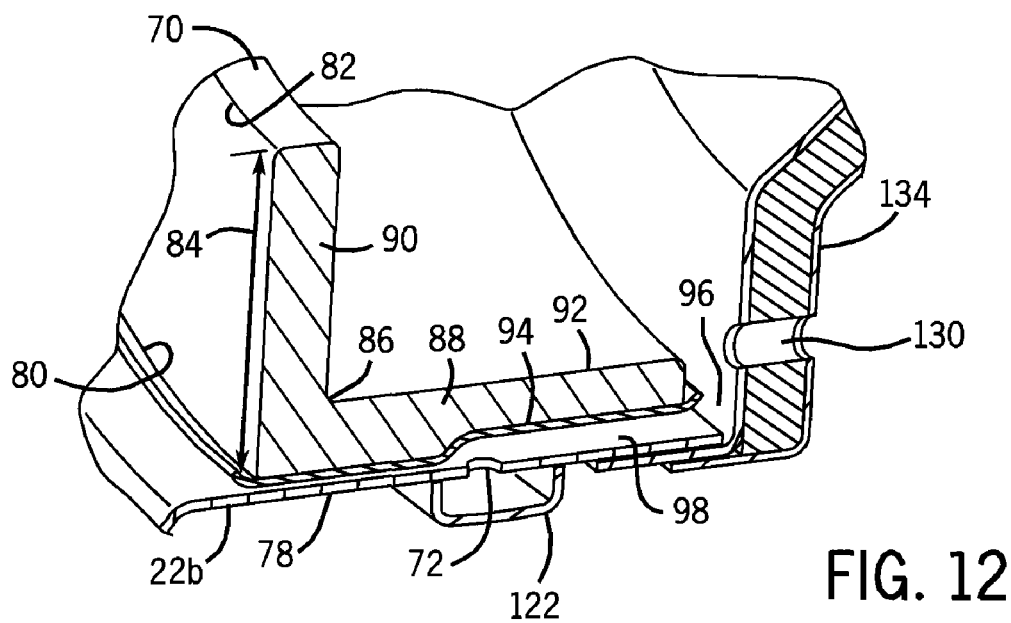
FIG. 12 is like FIG. 6 and shows another embodiment.

FIG. 12 shows another embodiment and uses like reference numerals from above where appropriate to facilitate understanding. In the above embodiments, water drains such as 72, 74, 76 extend radially relative to axis 40. In FIG. 12, and also as shown in dashed line in FIG. 10, water drains such as 130, 132, etc. extend axially through housing endwall 134 which is spaced axially downstream from water trap 70. Drain holes 130, 132, etc. may be used in addition to or in place of drain holes 72, 74, 76. Unused drain holes such as 132, in the orientation of FIGS. 10, 12, may be closed, e.g. by a threaded plug. The drain hole which is used for water drainage, e.g. drain hole 130 in the orientation of FIGS. 10, 12, may be left open, or may have an optional attachment for a drain hose, for the purpose of directing drainage water to a suitable location on the vehicle for drainage.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An exhaust assembly comprising a housing having an inlet receiving exhaust, an outlet discharging said exhaust, an interior chamber through which said exhaust flows from upstream to downstream from said inlet along a downstream direction to said outlet an exhaust pipe extending from said outlet and directing said exhaust to atmosphere, said housing extending axially along an axis having at least a partial vector component extending horizontally, a water trap in said housing downstream of said interior chamber and upstream of said outlet and blocking water which may enter said exhaust pipe from flowing along an upstream direction into said interior chamber, said water trap blocking upstream water flow at a plurality of angular positions of said housing about said axis, wherein said exhaust flows through said interior chamber along a flow direction parallel to said axis, wherein said housing has a plurality of water drains at a respective plurality of angular positions about said axis, said water drains being arcuately spaced from each other about said axis, such that:
   in one of said angular positions of said housing about said axis, one of said water drains is gravitationally lower than another of said water drains, such that exhaust flows out of said other water drain, and water in said housing flows out of said one water drain until dry;
   in another of said angular positions of said housing about said axis, said other of said water drains is gravitationally lower than said one of said water drains, such that exhaust flows out of said one water drain, and water in said housing flows out of said other water drain until dry.
2. The exhaust assembly according to claim 1 wherein said plurality of angular positions comprise at least two angular positions spaced by at least 180°.

3. The exhaust assembly according to claim 1 wherein said exhaust pipe is a side outlet exhaust pipe extending non-parallel to said axis, and wherein said side outlet exhaust pipe is rotatable 360° about said axis, and said plurality of angular positions lie along a 360° arc about said axis.

4. The exhaust assembly according to claim 1 wherein said water trap comprises a dam extending non-parallel to said axis and having a constant vertical height which is the same in each of said angular positions.

5. The exhaust assembly according to claim 4 wherein said housing comprises a cylindrical sidewall, and said dam is an annulus having an outer circumference at said sidewall and extending radially inwardly to an inner circumference, the vertical span between said inner and outer circumferences at the bottom of said annulus providing said constant vertical height which is the same in each of said angular positions.

6. The exhaust assembly according to claim 1 wherein said housing has a sidewall, and said water trap comprises a dam comprising an L-shaped member in cross-section comprising a first leg extending along said sidewall, and a second leg extending non-parallel to said axis.

7. The exhaust assembly according to claim 6 wherein said dam comprises an L-shaped thermal insulation member, including each of said first and second legs being thermally insulating, to both: a) block upstream water flow, particularly by said second leg; and b) reduce outer skin temperature of said sidewall, particularly by said first leg.

8. The exhaust assembly according to claim 6 wherein said dam comprises an L-shaped flange having an outer surface at said first leg secured to said housing at said sidewall.

9. The exhaust assembly according to claim 8 wherein said sidewall has an inner surface with thermal insulation extending therealong, and said outer surface of said L-shaped flange at said first leg is welded to said thermal insulation at said sidewall.

10. The exhaust assembly according to claim 1 comprising a plurality of diffusers external to said housing, each spaced radially outwardly of a respective said water drain relative to said axis, said diffusers dispersing said exhaust from the respective said water drain when the latter is not draining water, whereby to aid in cooling of said exhaust.

11. The exhaust assembly according to claim 10 wherein said housing has a sidewall with an outer surface subject to engagement by one or more mounting clamps, and wherein said water drains comprise holes through said sidewall, and said diffusers comprise shrouds spaced radially outwardly of said holes and ensuring that said holes are not blocked by said mounting clamps.

12. The exhaust assembly according to claim 10 wherein said housing has an arcuate sidewall, said water drains comprise holes through said sidewall, and said diffusers comprise shrouds deflecting said exhaust to flow tangentially relative to said arcuate sidewall.

13. The exhaust assembly according to claim 1 wherein said water drains extend radially relative to said axis.

14. The exhaust assembly according to claim 1 wherein said water drains extend axially.

15. The exhaust assembly according to claim 1 wherein said housing has an endwall axially spaced downstream from said water trap, and said water drains extend through said endwall.

* * * * *